United States Patent [19]
Domecki

[11] 3,787,928
[45] Jan. 29, 1974

[54] SHRIMP SPLITTING AND CLEANING APPARATUS
[76] Inventor: Edward H. Domecki, 2140 N.E. 30th St., Lighthouse Point, Fla. 33064
[22] Filed: June 19, 1972
[21] Appl. No.: 264,358

[52] U.S. Cl. ................................................ 17/71
[51] Int. Cl. ........................................... A22c 29/00
[58] Field of Search ................................. 17/71, 72

[56] References Cited
UNITED STATES PATENTS
| | | | |
|---|---|---|---|
| 3,698,038 | 10/1972 | Jones | 17/71 |
| 3,528,125 | 9/1970 | Jones | 17/71 X |
| 3,703,746 | 11/1972 | Jones | 17/71 |

Primary Examiner—Louis G. Mancene
Assistant Examiner—D. L. Weinhold
Attorney, Agent, or Firm—Cyril M. Hajewski

[57] ABSTRACT

A shrimp splitting and cleaning machine in which the shrimp are mounted on a rotating transport wheel which feeds them through the splitting and cleaning mechanism. Flexible guide wheels position the shrimp on the transport wheel while a spring urged pressure fork forces the shrimp onto pins that protrude from the transport wheel. The latter then moves the shrimp through a saw which cuts through the center of the shrimp longitudinally without severing the bottom layer of its shell. The shrimp is then fed into a spreading knife which enters the cut shrimp and splits it open like a book. The wheel then moves the opened shrimp past a rotating brush while water under pressure is directed onto the shrimp to thoroughly clean out the vein and roe and loose particles of shell that may be present. A lifting fork then dislodges the shrimp from the pins on the transport wheel and a chute directs the cleaned shrimp onto a conveyor for removal from the machine.

19 Claims, 7 Drawing Figures

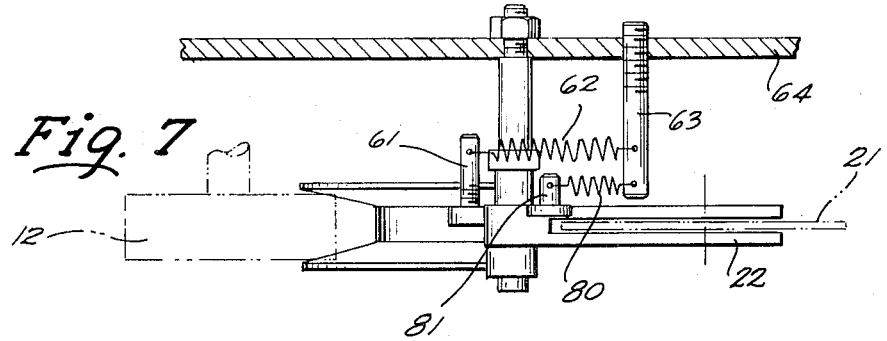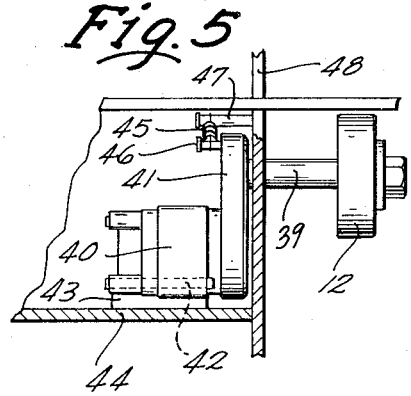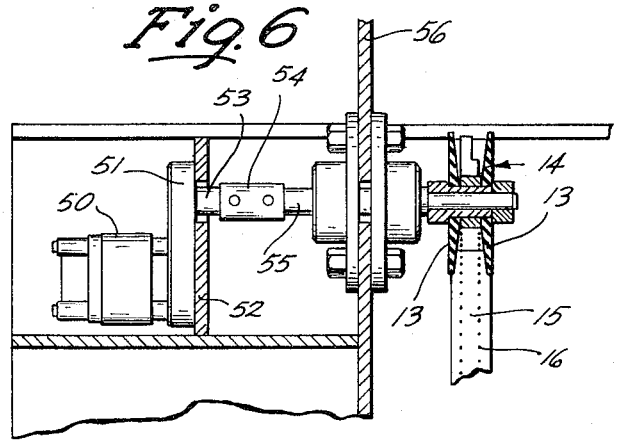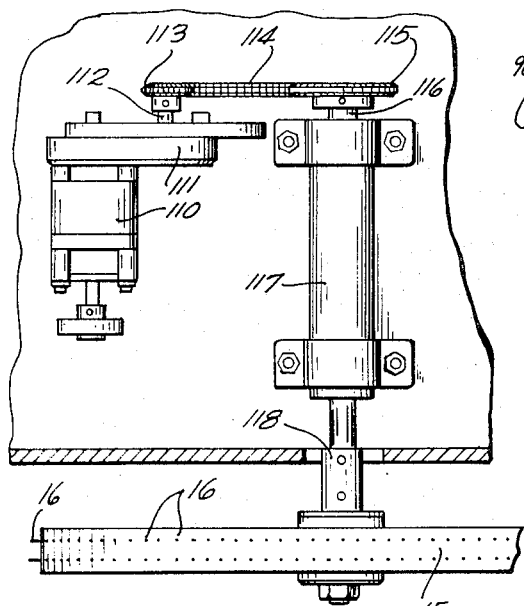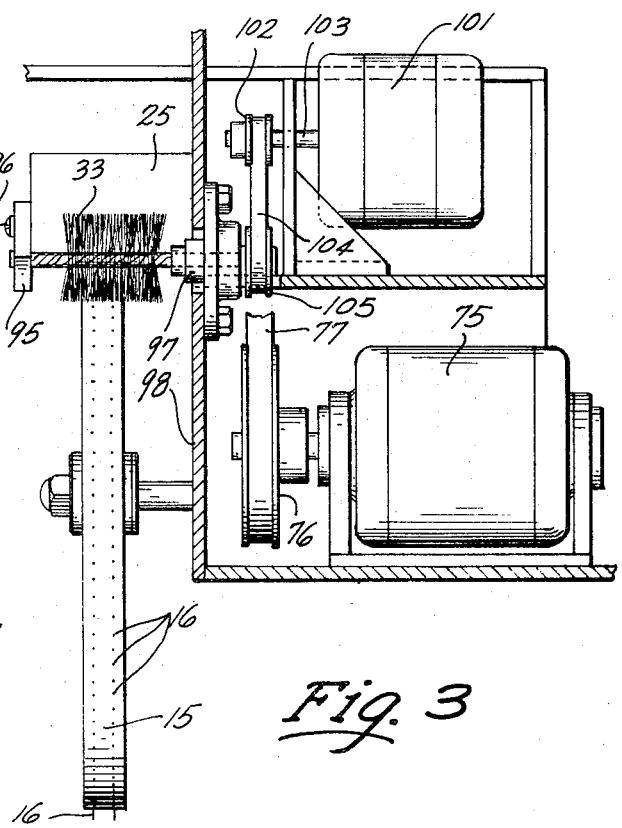

SHRIMP SPLITTING AND CLEANING APPARATUS

BACKGROUND OF THE INVENTION

The present invention pertains to the splitting and cleaning of crustaceans belonging to the order Decapoda and is particularly directed to the splitting and cleaning of shrimp and is especially well adapted for operating on the Sicyoria Brevirostris more commonly known as the Rock Shrimp.

Although the present invention is applicable in whole or in part to the splitting and cleaning of a large variety of crustaceans it was conceived during the development of processes suitable for marketing the Rock Shrimp. The shell of the Rock Shrimp is much heavier and harder than the shell of the shrimp which are presently popular as a food, such as the Crago and allied genera. Although the Rock Shrimp is a member of the shrimp family and has the appearance of the more popular shrimp, it has many characteristics which are different than those of the shrimp that are presently popular as food. It frequently occurs that the Rock Shrimp are caught along with the more favorite type of shrimp but have been returned to the seas as an undesirable type before the shrimp boat returns to its dock. One of the main reasons for its unpopularity is its tough shell which cannot be removed by the commonly accepted methods for peeling shrimp.

It is therefore a general object of the present invention to provide an improved mechanism for splitting the body from crustaceans having a relatively heavy shell and which is especially well adapted to process Rock Shrimp for marketing in a suitable form.

It is an object of the present invention to provide an automatic mechanism for splitting the shrimp and cleaning the vein and roe as well as any other matter from shrimp with the mechanism being especially adapted to operate upon the tough and heavy shell of Rock Shrimp.

It is a further object to provide a shrimp splitting and cleaning apparatus that will perform its function rapidly and with outstanding efficiency.

SUMMARY OF THE INVENTION

According to the present invention a rotary transport wheel is provided for transferring the shrimp through the various stations of the apparatus. An improved loading mechanism serves to guide the shrimp from a work table onto the transport wheel. A spring loaded fork urges the shrimp onto the transport wheel to impale them on pins that extend radially from the wheel.

From the loading mechanism the shrimp is transported through a rotating circular saw which cuts through the shrimp longitudinally along its dorsal side without severing the bottom layer of its shell. Immediately after leaving the saw, a separating or spreading knife enters between the two portions of the shrimp formed by the cut of the saw. The separating knife has a point which enters between the two portions of the shrimp and then tapers outwardly to a wide base so it is in the form of an isosceles triangle. As the shrimp moves toward the base of the knife the shell is cracked at the bottom and the shrimp is spread outwardly like the pages of a book to completely expose the meat of the shrimp.

The transport wheel then moves the shrimp into a cleaning station where water under pressure is passed through nozzles which direct it onto the shrimp. At the same time, a rotating brush is operating on the meat of the shrimp to remove all of the vein and roe along its dorsal side as well as to remove any other matter which may be present.

The shrimp are now ready to be removed from the transport wheel and this is accomplished automatically at an unloading station by a flexible lifting fork. The transport wheel moves the shrimp onto the lifting fork which is positioned so that as the shrimp moves forwardly the stationary fork lifts them off the pins on the wheel and into a chute which guides them onto a conveyor for removal from the machine.

The shrimp is now ready for marketing. The consumer preferably cooks the split shrimp with the meat remaining attached to the shell and the diner removes it from the shell much as the meat of a lobster tail may be removed from the shell when eating it.

The foregoing and other objects of this invention which will become more fully apparent from the following detailed description, may be achieved by means of the exemplifying apparatus depicted in and set forth in this specification in connection with the accompanying drawings.

BRIEF DESCRIPTION OF THE DRAWING

FIG. 3 is a detail view in front elevation with parts broken away showing the electrical motor and its drive for rotating the cleaning brush as well as the electric motor for rotating the saw with only a portion of the drive belt being illustrated;

FIG. 4 is a plan view depicting the power drive train for rotating the shrimp transport wheel;

FIG. 5 is a detail view in rear elevation with parts broken away showing the power drive train for rotating the pivotal feed wheel of the feeding mechanism;

FIG. 6 is a detail view in rear elevation with parts broken away showing the power drive train for rotating the flexible guide wheel of the feeding mechanism; and FIG. 7 is a detail view showing the arrangements for spring urging the pivotal pressure fork at the loading station and the pivotal hold down fork at the splitting station.

DESCRIPTION OF THE PREFERRED EMBODIMENT

GENERAL DESCRIPTION

Figure 1:
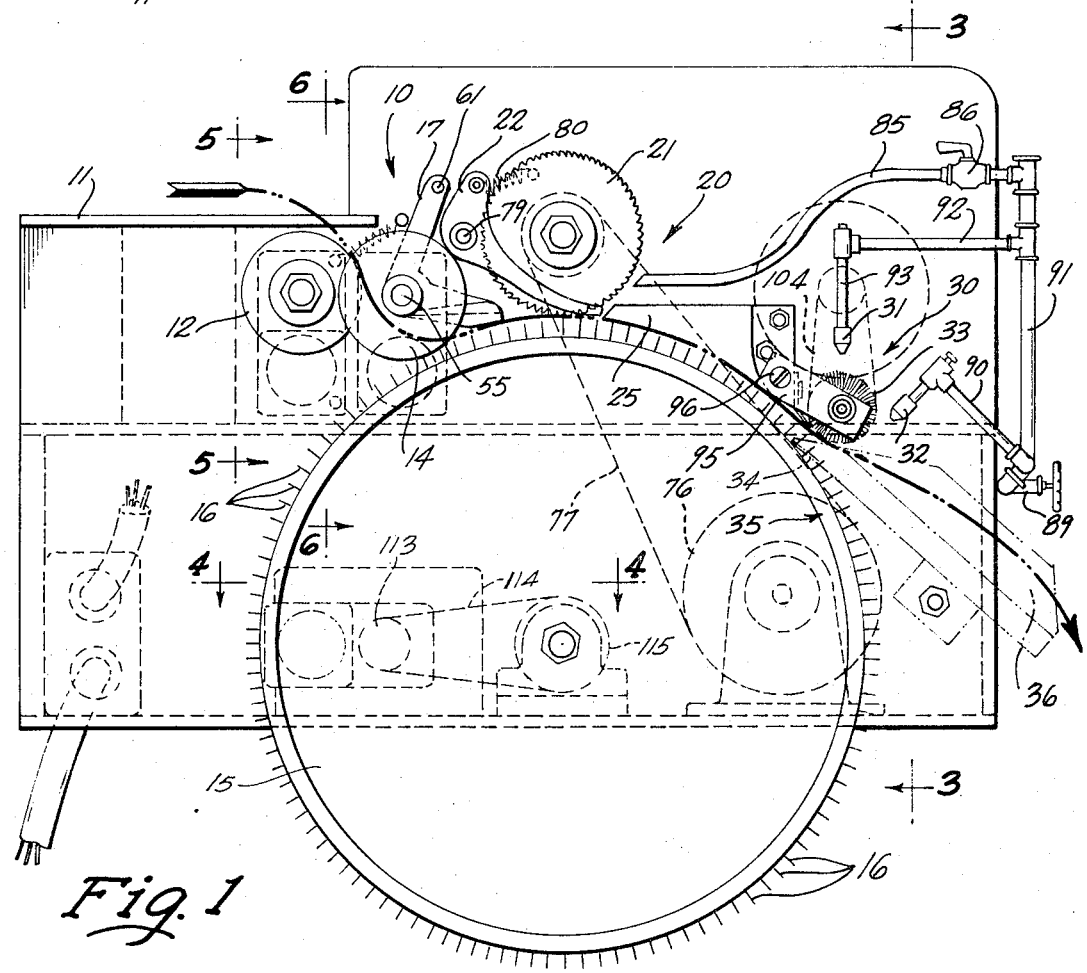
FIG. 1 is a view in side elevation illustrating the improved Shrimp Splitting and Cleaning Apparatus of the present invention.

Reference is now made more particularly to the drawings and specifically to FIG. 1 thereof which illustrates a shrimp cleaning and splitting machine incorporating the features of the present invention. The shrimp to be processed by the machine may be placed on table 11 which is part of a loading station generally identified by the reference numeral 10. The loading station 10 includes a pressure wheel 12 which is in engagement with flexible flanges 13 of a guide wheel 14. The pressure wheel 12 is rotating in a clockwise direction as viewed in FIG. 1 while the guide wheel 14 is rotating in the opposite direction. The shrimp to be split and cleaned are guided between the pressure wheel 12 and the guide wheel 14 which serves to center them on a transport wheel 15. A plurality of pins 16 extend radially from the entire periphery of the transport wheel 15 and the shrimp that pass through the wheels 12 and 14 are centered on these pins 16. A pressure fork 17 applies pressure on the shrimp that have been centered on the transport wheel 15 and impales them upon the pins 16 so that the shrimp are secured to the transport wheel 15 which transfers them from station to station in the apparatus.

The shrimp impaled upon the pins 16 are moved by the rotating transport wheel 15 to a splitting station generally identified by the reference numeral 20. The shrimp are moved past a saw 21 which cuts through the shrimp longitudinally along its dorsal side except that the bottom layer of shell is not severed so that the two halves are not separated. As the saw is operating on the shrimp, the latter is held down by a hold down fork 22 which prevents the shrimp from being lifted off the pins 16 by the rotating saw 21.

Immediately after the shrimp has been split by the saw 21, a pointed end of a spreading knife 25 enters between the split portions of the shrimp and the knife widens rapidly so that as the shrimp is moved along by the transport wheel 15, it engages the widened portion of the knife, and body of the shrimp is opened like a book to completely expose the meat of the shrimp.

The two portions of the shrimp are completely opened without being separated from each other. In this condition the shrimp is passed through a cleaning station generally identified by the reference numeral 30. At this station, nozzles 31 and 32 direct sprays of water under pressure upon the shrimp while a rotating brush 33 operates upon the shrimp to thoroughly clean the vein and roe from the shrimp as well as any other matter which may be present.

The cleaned shrimp is then engaged by lifting fingers 34 which extend from a chute 36 at an unloading station generally identified by the reference numeral 35. The lifting fingers 34 are adjacent to the periphery of the transport wheel 15 and lie between the pins 16 so that the cleaned shrimp is moved on top of the lifting fingers 34 to lift it off of the pins 16 and into the chute 36 which directs the split and cleaned shrimp onto a conveyor (not shown).

LOADING STATION

At the loading station 10, the pressure wheel 12 and the guide wheel 14 cooperate to guide the shrimp onto the transport wheel 15. The shrimp is centrally positioned on the transport wheel 15 and then is pressed onto the wheel by the pressure fork 17 which applies sufficient pressure to impale the shrimp upon the shrimp 16 so that it is secured to the wheel.

The pressure wheel 12 is rotating in a clockwise direction as viewed in FIG. 1 and its driving mechanism is illustrated in FIG. 5. As there shown, the wheel is actuated by an electric motor 40 which is connected to drive a gear reducing mechanism 41 that has an output shaft 39 to which the pressure wheel 12 is keyed for rotation therewith.

The pressure wheel 12 is yieldably urged toward the guide wheel 14 and its periphery is disposed between the two flexible flanges 13 of the guide wheel 14. To this end, the motor 40 is supported for pivotal movement by a single pin 42 which is carried by a bracket 43 that is secured to a plate 44. The unit is constantly urged in a pivotal movement about the pin 42 by a spring 45 which has one end connected to a pin 46 that is secured to the housing of the gear reducer 41. The outer end of the spring 45 is connected to a rod 47 that is rigidly secured to a vertical plate 48. With this arrangement, the spring 46 continuously urges the entire unit in a pivotal movement about the pin 42 to urge the pressure wheel 12 between the flanges 13 of the guide wheel 14. As the shrimp passes between the pressure wheel 12 and the guide wheel 14, the pressure wheel 12 yields to accommodate the particular size shrimp that is passing between the two wheels.

The drive mechanism for the guide wheel 14 is illustrated in FIG. 6 and includes a motor 50 connected to actuate a gear reducing unit 51. The latter is fixed to a vertical plate 52 and its output shaft 53 is connected by a coupling 54 to drive a shaft 55 that is journalled in a vertical plate 56. The guide wheel 14 is keyed to rotate with the shaft 55 in response to energization of the motor 50.

The shrimp to be processed is wedged between the two flanges 13 and therefore rotates with the guide wheel 14 which centers it with respect to the transport wheel 15. The shrimp is then engaged by the pressure fork 17 which shifts it out of the guide wheel 14 and forces it upon the pins 16. As clearly illustrated in FIG. 1, the pressure fork 17 is of a bell crank configuration being journalled for pivotal movement about the same shaft 55 that supports the wheel 14, the hub of the pressure fork 17 being journalled on the hub of the guide wheel 14 between the two flexible flanges 13. The lower lever of the bell crank 50 engages the shrimp while the upper lever is provided with a pin 61 which has a spring 62 attached to it as best shown in FIG. 7. The opposite end of the spring 62 is connected to a stud 63 which is threadedly engaged with a vertical plate 64. The spring 62 continuously urges the pressure fork 17 about the hub of the wheel 14 in a clockwise direction as viewed in FIG. 1 to apply pressure to the shrimp on the transport wheel 15.

SPLITTING STATION

Figure 2:
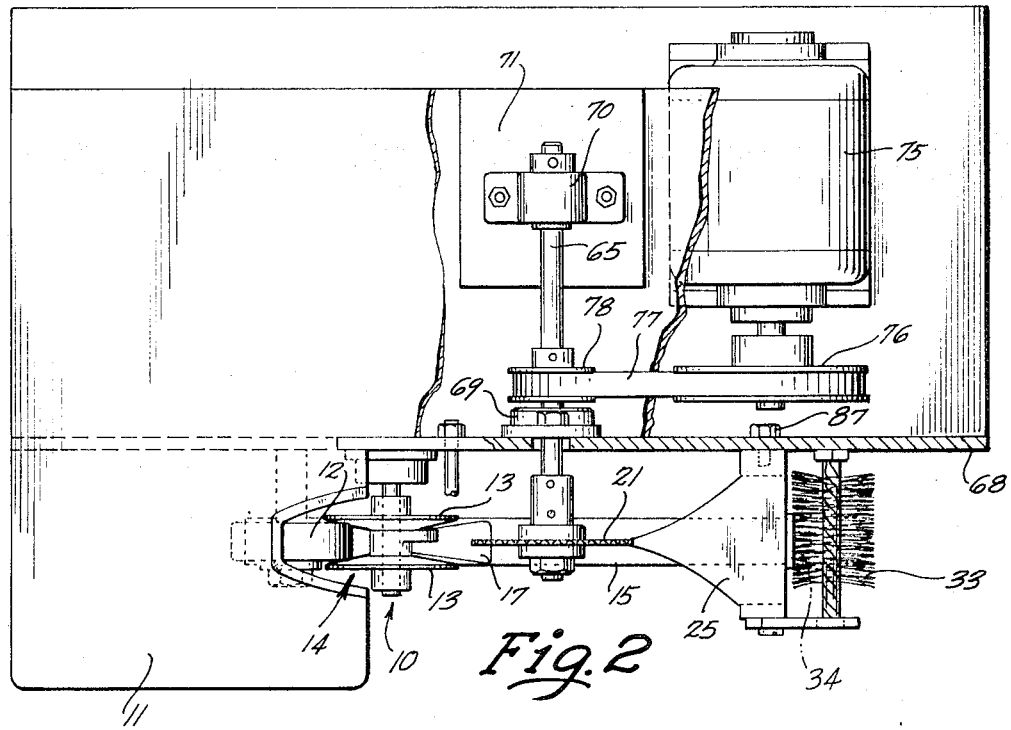
FIG. 2 is a plan view of the apparatus illustrated in FIG. 1.

As previously mentioned, the splitting station serves to cut through the body of the shrimp longitudinally along its dorsal side without severing the bottom layer of the shell. The two split portions are then spread open like a book, to expose the meat of the shrimp. The cutting operation is accomplished by the saw 21. As best seen in FIG. 2, the saw is mounted on a shaft 65 which extends through an opening in a vertical plate 68 and is journalled in a bearing 69 that is mounted on the plate 68 as well as in a bearing block 70 that is fixed to a horizontal plate 71. The shaft 65 and its associated saw 21 are rotated by a motor 75 which is provided with a pulley 76 keyed to its output shaft for driving a belt 77 which also embraces a pulley 78 that is fixed to the shaft 65. Accordingly, the belt 77 transmits the drive from the motor 75 to the shaft 65 for rotating the saw 21.

While the saw is operating upon the body of the shrimp as the transport wheel 15 is feeding the shrimp into the saw, the saw has a tendency to dislodge the shrimp from the pins 16 which would release it from the wheel 15. In order to prevent this occurence, the hold down fork 22 applies a pressure to the shrimp to retain it in engagement with the pins 16. To this end, the transport wheel 15 moves the shrimp under the hold down fork 22 which causes the latter to pivot in a counterclockwise direction as viewed in FIG. 1 about a pin 79. The hold down fork 22 is also in the configuration of a bell crank and, as shown in FIG. 7, a spring 80 is continuously urging the hold down fork 22 in a clockwise direction. The spring 80 has one end connected to the stud 63 and its opposite end connected to a pin 81 which is secured to the upper end of the hold down fork 22. Therefore, as the shrimp moves underneath the fork portion of the hold down fork 22, the counterclockwise pivoting of the fork 22 is against the force applied by the spring 80 which serves to retain the shrimp in engagement with the pins 16 while the saw 21 is operating upon its shell.

The sawdust which may be generated by the saw 21 is washed away by a spray of water directed through a conduit 85 which flows through a petcock 86 from a suitable source (not shown). The spray of water also serves to prevent the generation of heat on the shrimp as it is being sawed.

Although the saw 21 serves to cut through the shrimp longitudinally along its dorsal side, the bottom layer of shell is not severed and the shell remains closed with the meat of the shrimp enclosed therein. In order for the cleaning operations to be performed, it is necessary to expose the meat of the shrimp to this end, the transport wheel 15 feeds the shrimp into the spreading knife 25. As best seen in FIG. 2, the spreading knife 25 is in the form of an isosceles triangle and the transport wheel 15 feeds the shrimp into the tip of the triangle. The tip enters between the two severed portions of the body and as the shrimp progresses with the movement of the transport wheel 15, the shrimp progressively engages the wider portions of the triangle which serves to split the shrimp apart and open it like a book. This operation actually cracks the shell to split the shrimp apart and fully expose its meat without actually detaching the meat from the shell.

The base of the triangle formed by the spreading knife 25 is secured to the vertical plate 68 by a bolt 87 which serves to rigidly secure the spreading knife 25 in position above the transport wheel 15. It will also be noted, that the spreading knife 25 extends downwardly from the horizontal portion to present a curved surface having a radius conforming to the radius of the transport wheel 15 with the curved portion lying directly adjacent to the exterior extremities of the pins 16. Accordingly, as the shrimp progresses along a path defined by the diameter of the transport wheel 15, it remains engaged with the spreading knife 25 to fully split it apart.

CLEANING STATION

The transport wheel 15 moves the shrimp past the spreading knife 25 to open the shrimp and expose its meat. With the meat fully exposed, the shrimp is passed through the cleaning station 30 for the removal of the vein and roe and any other foreign matter that may be present including particles of the shell generated by the saw 21. Water is sprayed upon the shrimp through the two nozzles 31 and 32, the water being obtained from a suitable source under pressure through a valve 89 and through a conduit 90 to the nozzle 32. The nozzle 31 is supplied with water under pressure from the same source through a conduit 91 and a branch conduit 92 as well as a pipe 93 to which the nozzle 31 is connected. The two nozzles 31 and 32 thoroughly envelope the shrimp and while the water is being sprayed upon the shrimp, it passes through the rotating brush 33.

As best seen in FIG. 3, the brush 33 has one end journalled in a bar 95 that is secured by a screw 96 to the spreading knife 25 as clearly shown in FIG. 1. The other end of the brush is journalled in a bearing 97 that is mounted on a vertical plate 98.

As best illustrated in FIG. 3, the brush 33 is rotated by a motor 101 having a pulley 102 keyed to its output shaft 103. A drive belt 104 is in engagement with the pulley 102 as well as with a pulley 105 that is keyed to the shaft which is connected to drive the brush 33.

Thus, the exposed meat of the shrimp is subjected to a heavy spray of water from the nozzles 31 and 32 while it is being acted upon by the brush 33 so that it is thoroughly cleaned.

UNLOADING STATION

The transport wheel 15 rotates continuously and after the shrimp has passed through the cleaning station 33 its processing has been completed and it is ready to be removed from the apparatus. Accordingly, the lifting fingers 34 extend forwardly from the chute 36 and are adjacent to the surface of the transport wheel 15 between the pins 16 as shown in FIGS. 1 and 2. The shrimp, therefore, moves onto the lifting fingers 34, and the latter being at an angle to the periphery of the transport wheel 15 lift the shrimp off of the pins 16 to remove it from the transport wheel 15 and direct it into the chute 36 which allows the split and cleaned shrimp to drop by gravity onto a conveyor (not shown) which carries the shrimp away for further processing, such as packaging.

TRANSPORT WHEEL DRIVE

The rotation of the transport wheel 15 is uninterrupted for continuously moving the shrimp through the several stations for opening it and cleaning the meat. The drive for rotating the transport wheel 15 is best illustrated in FIG. 4. As there shown, it is rotated by an electric motor 110 which is connected to drive a gear reducing unit 111. An output shaft 112 of the gear reducing unit 111 has a small sprocket 113 keyed to it and the sprocket is in engagement with a continuous chain 114. The chain 114 is also in engagement with a large sprocket 115 that is keyed to a shaft 116 which is journalled in a bearing 117. The transport wheel 15 is coupled to the shaft 116 by a coupling 118 to complete the drive from the motor 110 to the transport wheel 15.

From the foregoing detailed description of the illustrative embodiment of the invention set forth herein it will be apparent that there has been provided an improved apparatus especially adapted for opening the unusually strong shell of the rock shrimp to fully expose the meat of the shrimp and then to thoroughly clean the vein and roe from the shrimp as well as to remove any particles of the shell that may have been produced in opening it.

Although the illustrative embodiment of the invention has been described in considerable detail for the purpose of disclosing a practical operative structure whereby the invention may be practised advantageously, it is to be understood that the particular shrimp splitting and cleaning apparatus is intended to be illustrative only and that the various novel characteristics of the invention may be incorporated in other structural forms without departing from the spirit and scope of the invention as defined in the subjoined claims.

The principles of the invention having now been fully explained in connection with the foregoing description of the illustrative embodiment, the invention is hereby claimed as follows:

1. In a machine for splitting shrimp; a frame; transport means supported by said frame for moving the shrimp in a predetermined path of travel; cutting means operably mounted on said frame in the path of travel of the shrimp as it is being moved by said transport means to cut along the length of the body, of the shrimp through its shell and body without severing the bottom layer of its shell and split it longitudinally into two portions; and spreading means carried by said frame in position to engage the split shrimp as it is being moved by said transport means to spread the two halves of the shrimp apart to open it like a book to expose the meat of the shrimp.

2. A shrimp splitting machine according to claim 1 including; hold down means for holding the shrimp onto said transport means while it is being operated upon by said cutting means.

3. A shrimp splitting machine according to claim 1 including; a source of water pressure; and means directing the water onto said shrimp while it is being operated upon by said cutting means.

4. A srhimp splitting machine according to claim 1 including; cleaning means disposed in said path of travel of the shrimp to clean the shrimp after it has been spread open by said spreading means to clean the vein and roe as well as any foreign matter from the shrimp.

5. A shrimp splitting machine according to claim 4 wherein said cleaning means comprises; a rotary brush mounted in position to engage the split shrimp as it is being moved by said transport means; a source of water pressure; and means directing the water pressure onto the shrimp while it is being operated upon by said brush.

6. A shrimp splitting machine according to claim 2 including; a rotary brush mounted in position to engage the split shrimp as it is being moved by said transport means; a source of water pressure; and means directing the water pressure onto the shrimp while it is being operated upon by said brush.

7. A shrimp splitting machine according to claim 1 wherein said transport means comprises; a wheel rotatably supported by said frame; pins extending radially from said wheel for receiving the shrimp and securing them to said wheel; and means for rotating said wheel to move the shrimp carried therein.

8. A shrimp splitting machine according to claim 4 wherein said transport means comprises; a wheel rotatably supported by said frame; means extending radially from said wheel for receiving the shrimp and securing them to said wheel; and means for rotating said wheel to move the shrimp carried thereon through the stations of the machine.

9. A shrimp splitting machine according to claim 1 including; loading means carried by said frame for individually loading the shrimp onto said transport means in position so that the transport means will move said shrimp through said cutting means.

10. A shrimp splitting machine according to claim 9 wherein said loading means comprises a guide wheel having radially extending flexible flanges for receiving the shrimp to be processed between said flanges; a rotary pressure wheel having its periphery disposed between the flanges of said guide wheel and being yieldably biased toward said guide wheel so that the shrimp will be forced by said pressure wheel between the two flexible flanges of said guide wheel; means for rotating said pressure wheel; means for rotating said guide wheel to move the shrimp into alignment with said transport means; and means for extracting the aligned shrimp from said guide wheel and forcing them onto said transport means for movement through the machine.

11. A shrimp splitting machine according to claim 7 including; loading means carried by said frame for individually receiving the shrimp and guiding them into position with respect to said wheel; and pressure means to apply pressure to each individual shrimp in said loading means to extract the shrimp from said loading means and impale it onto said pins for securing it to said wheel.

12. A shrimp splitting machine according to claim 11 wherein said loading means comprises; a guide wheel having radially extending flexible flanges for receiving the shrimp to be processed between said flanges; a rotary pressure wheel having its periphery disposed between the flanges of said guide wheel and being yieldably biased toward said guide wheel so that the shrimp will be forced by said pressure wheel between the two flexible flanges of said guide wheel; means for rotating said pressure wheel; and means for rotating said guide wheel for moving the shrimp into alignment with said wheel and in position to be engaged by said pressure means.

13. A shrimp splitting machine according to claim 1 wherein; said cutting means is a rotary saw which saws through the shrimp to split it into two parts without severing completely through so that the two parts of the shrimp are not separated.

14. A shrimp splitting machine according to claim 2 wherein; said cutting means is a rotary saw which saws through the shrimp to split it into two parts without severing completely through so that the two parts of the shrimp are not separated but may be opened like a book by said spreading means.

15. A shrimp splitting machine according to claim 7 including; cleaning means disposed in said path of travel of the shrimp to clean the shrimp after it has been spread open by said spreading means to clean the vein and roe as well as any foreign matter from the shrimp.

16. A shrimp splitting machine according to claim 15 wherein said cleaning means comprises; a rotary brush mounted in position to engage the split shrimp as it is being moved by said wheel; a source of water pressure; and means directing the water pressure onto the shrimp while it is being operated upon by said brush.

17. In a machine for splitting shrimp; a frame; transport means supported by said frame for moving the shrimp in a predetermined path of travel; securing means for retaining the shrimp on said transport means; and cutting means operably mounted on said frame in the path of travel of the shrimp as it is being moved by said transport means to cut along the length of the body of the shrimp through its shell and body to split it longitudinally into two portions without dislodging it from said securing means.

18. A shrimp splitting machine according to claim 17 including; releasing means carried by said frame in position to engage the shrimp after it has been split by said cutting means to release the shrimp from said securing means for removal from said transport means.

19. A shrimp splitting machine according to claim 18 including cleaning means disposed to operate upon the shrimp before it is engaged by said releasing means to clean the vein and roe as well as any other foreign matter from the shrimp after it has been split by said cutting means.

* * * * *